DEMOUNTABLE BRAKE LINING

Original Filed Sept. 25, 1948 2 Sheets-Sheet 1

TEOFIL L. BONKOWSKI,
INVENTOR.

BY Lyon & Lyon

ATTORNEYS

DEMOUNTABLE BRAKE LINING

Original Filed Sept. 25, 1948 2 Sheets-Sheet 2

TEOFIL L. BONKOWSKI,
INVENTOR.

BY Lyon & Lyon
ATTORNEYS

United States Patent Office

Re. 24,476
Reissued May 20, 1958

24,476

DEMOUNTABLE BRAKE LINING

Teofil L. Bonkowski, Los Angeles, Calif.

Original No. 2,631,697, dated March 17, 1953, Serial No. 51,160, September 25, 1948. Application for reissue November 15, 1954, Serial No. 469,067

2 Claims. (Cl. 188—234)

Matter enclosed in heavy brackets [ ] appears in the original patent but forms no part of this reissue specification; matter printed in italics indicates the additions made by reissue.

My invention relates to demountable brake linings, that is, to brake linings which may be secured to or removed from a brake shoe without removal of the brake shoe from the vehicle. Included in the objects of my invention are:

First, to provide a demountable brake lining which is particularly simple to install, remove, or replace without the use of special tools.

Second, to provide a demountable brake lining which may be so arranged as to fit on a conventional brake shoe without changing or altering in any manner the construction of the brake shoe.

Third, to provide a demountable brake lining which eliminates the need of rivets and which may be so constructed that wear may proceed through the entire lining before metallic contact with the brake shoe can occur.

Fourth, to provide a demountable brake lining which is preformed to the curvature of the brake shoe and may be so arranged that it is secured against both circumferential and axial displacement.

With the above and other objects in view, as may appear hereinafter, reference is directed to the accompanying drawings in which.

Figure 1:
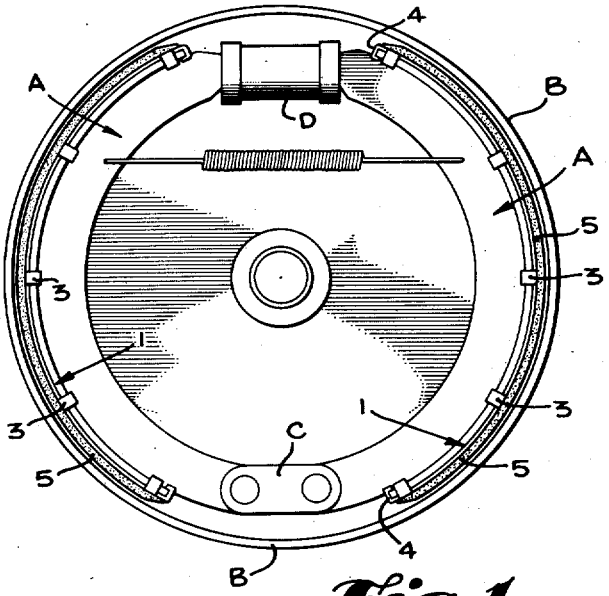
Fig. 1 is a substantially diagrammatical view of a vehicle brake showing one form of my demountable brake lining in position on the brake shoes.
Figure 2:
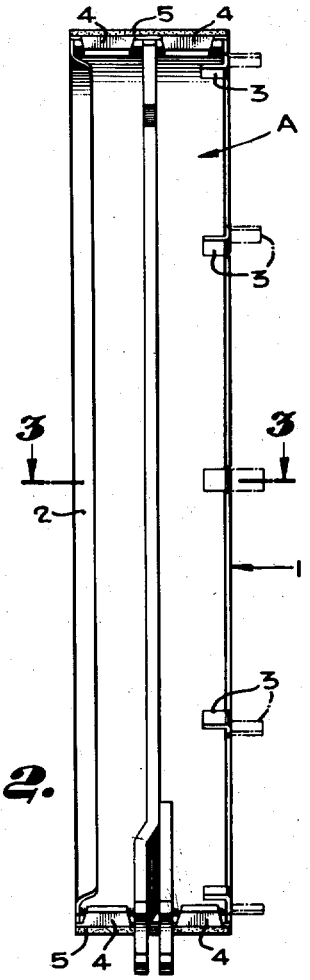
Fig. 2 is an enlarged view of a brake shoe, the view being taken from the radially inner side thereof and showing the manner in which one form of my demountable brake lining is secured thereto.
Figure 3:
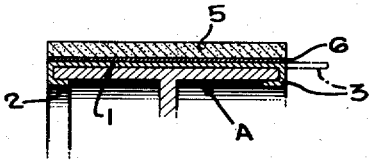
Fig. 3 is a transverse sectional view, taken through 3—3 of Fig. 2.

Reference is first directed to Figs. 1, 2, and 3. The structure herein illustrated is preferred for the reason that it may be adapted to use on a conventional brake shoe.

The conventional brake includes a pair of brake shoes A mounted within a brake drum B. The brake shoes are connected at one end by a suitable link C. At the other end a hydraulic cylinder D is interposed between the brake shoes so they may be expanded into contact with the brake drum. Each brake shoe is arcuate in form and T-shaped in cross section.

In the construction shown in Figs. 1, 2, and 3 a backing member 1 is provided which is formed of sheet metal and curved to conform to and overlie the brake shoe. One side of the backing member is folded to form an arcuate stiffening rib and locking channel or lip 2. The channel is adapted to hook over the axially inner side of the brake shoe. The opposite or outer edge of the backing member is provided with a set of tabs 3 which are initially straight as indicated by broken lines in Figs. 2 and 3, but which, after placement of the backing member on the brake shoe are adapted to be bent over so as to engage the corresponding axial margin of the brake shoe. The circumferential extremities of the backing member are provided with end lugs 4 which overlie the corresponding extremities or ends of the brake shoe.

The backing member 1 is covered by a brake lining 5 which is preferably cemented thereto as indicated by 6. Such lining 5 may be a conventional molded lining having the usual substantially rigid inherently arcuate shape. By this arrangement all rivets or other means which must protrude into the lining are eliminated so that the lining may wear virtually its entire thickness before replacement is necessary or before metal-to-metal contact occurs. In addition, the backing member may have transverse ridges and grooves and the brake lining molded accordingly.

My demountable brake lining is employed as follows:

To install the brake lining, it is merely necessary to remove the wheel and brake drum and expose the brake shoes, assuming, of course, that the shoes are not equipped with conventional brake lining. The backing member is then slipped over the brake shoe from the exposed or accessible side thereof with the channel 2 towards the inner axial side of the brake shoe until such channel hooks over and engages the brake shoe. The tabs 3 are then bent over to grip the axially outer or accessible side of the brake shoe. To remove, it is merely necessary to bend these tabs 3 to their initial position and unhook the backing member from the brake shoe. It thus will be seen that a minimum amount of work is necessary to install or replace my demountable brake lining and that no special tools are required.

The channel member 2 greatly stiffens the backing member so as to reduce the possibility that the relatively brittle brake lining may be broken or torn loose during handling or shipment, as might be the case if the backing member should flex.

Figure 4:
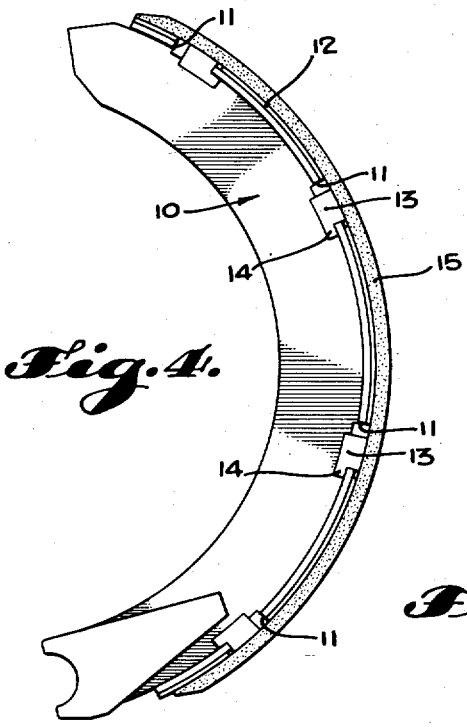
Fig. 4 is a side view of a brake shoe using a modified form of my demountable brake lining thereon.
Figure 5:
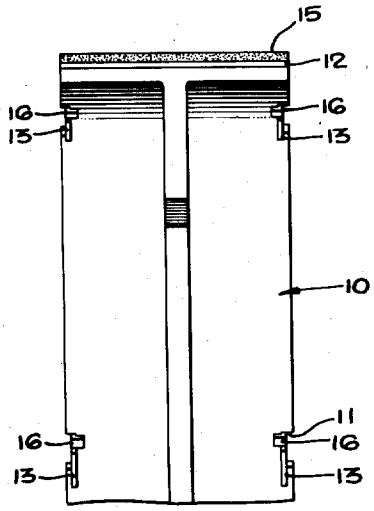
Fig. 5 is a fragmentary view from the radially inner side of the brake shoe shown in Fig. 4.
Figure 6:
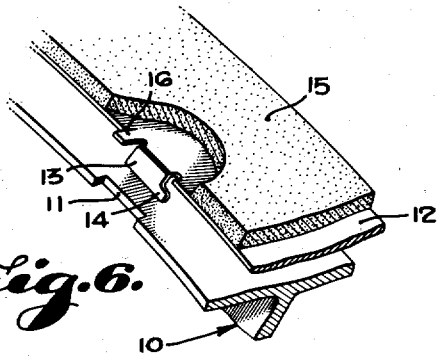
Fig. 6 is a fragmentary perspective view of the brake shoe and lining shown in Figs. 4 and 5, the parts being separated to illustrate the manner in which they are assembled.

Reference is now directed to Figs. 4, 5, and 6. In this construction an otherwise conventional brake shoe 10 is modified by providing recesses or notches 11 at spaced points along the axially inner and axially outer margins of the brake shoe. A backing plate 12 is provided which is formed of sheet metal, as in the first described case. Side lugs 13 are bent radially inwardly from the backing plate 12. *This may be done prior to installing the backing plate on the shoe as shown in Fig. 6, or after positioning the backing plate on the shoe as in the first described structure.* The lugs preferably include circumferentially directed tongues 14. The backing plate is covered by a lining 15 which is preferably cemented thereto as in the first directed structure.

To employ the structure shown in Figs. 4, 5, and 6, it is merely necessary to spring the backing plate over the brake shoe and guide the lugs 13 into the notches 11 and then move the backing plate arcuately a slight distance so that the tongues 14 underlie the corresponding extremities of the notches 11, *or to bend the lugs as in the first described structure.* Locking tabs 16 formed by slitting the backing plate adjacent the lugs 13 may be bent into the notches 11 behind the lugs to prevent accidental disengagement.

*It should be observed that one or both margins of the brake shoe A associated with the first described structure may be provided with circumferential interlocking means or notches, such as the notches 11 of the structure shown in Figs. 4, 5, and 6, and the tabs 3 may be bent therein to effect circumferential locking of the backing plate on the brake shoe.*

Figure 7:
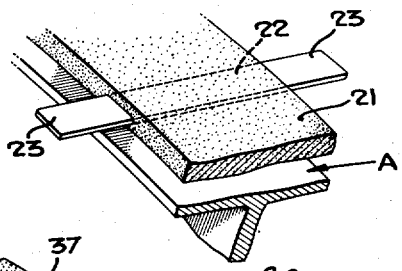
Fig. 7 is a fragmentary perspective view of a further modified form of my brake lining shown in spaced relation to a brake shoe.

Reference is now directed to Fig. 7. This construction is adapted to be employed on the conventional brake shoe A or on the special brake shoe 10. This construction includes a lining 21 in which is molded insert strips 22 which are disposed crosswise or axially and terminate at tab ends 23 which protrude from the lining 21 and are adapted to be folded over the margins of the brake shoe in the manner of the tabs 2 and 3 of the first described structure. Additional tabs may extend circumferentially from the extremities of the lining 21 to perform the function of the end lugs 4 of the first described structure.

Figure 9:
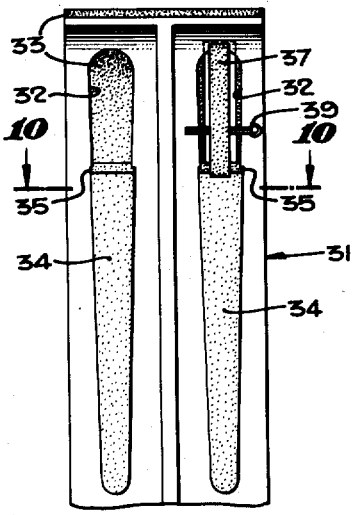
Fig. 9 is a fragmentary view showing the radially inner side of the brake shoe and lining depicted in Figure 8.
Figure 8:
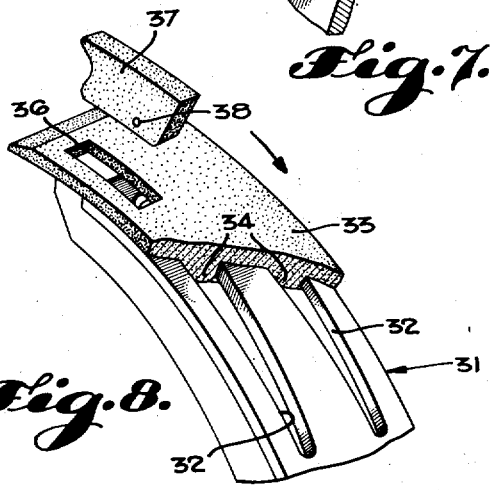
Fig. 8 is a fragmentary perspective view of a further modified form of brake shoe with the lining shown in the process of assembly thereon.
Figure 10:
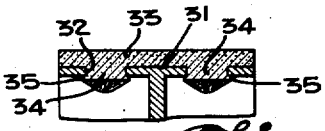
Fig. 10 is a fragmentary transverse sectional view through 10—10 of Fig. 9.

Reference is now directed to Figs. 8, 9, and 10. The structure here shown involves a special brake shoe 31 which differs from the conventional in that it is provided with pairs of tapered slots 32. A molded lining 33 is employed which includes integral tapered bosses 34 adapted to fit the tapered slots 32. The bosses 34 preferably are provided with small side ribs 35 so as to interlock with the margins of the tapered slots 32.

At the larger end of one or more tapered bosses 34, the lining is provided with a keeper opening 36 which receives a keeper plug 37 formed of brake lining material. The keeper plug is adapted to be inserted in the keeper opening and extends into the tapered slot 32 to prevent withdrawal of the bosses 34. The keeper plug is provided with a cotter pin hole 38 to receive a cotter pin 39 employed to prevent removal of the keeper plug.

Assembly of the structure shown in Figs. 8, 9, and 10 is as follows:

The molded brake lining 33 is placed over the brake shoe and the bosses 34 are pressed into the slots 32. The lining is then moved circumferentially in the direction of the arrow in Fig. 8 until the bosses interlock with the slots, whereupon the keeper plug, or plugs, is inserted and the cotter pin 39 placed to prevent withdrawal of the keeper plug.

Having fully described my invention, it is to be understood that I do not wish to be limited to the details herein set forth, but my invention is of the full scope of the appended claims.

I claim:

1. A demountable brake lining for brake shoes of arcuate form, comprising: an arcuate sheet metal backing plate having a radius of curvature substantially equal to that of the outer surface of the brake shoe, one margin only of said arcuate backing plate having a continuous circumferentially extending, radially inwardly directed flange, said flange terminating along its radially inner edge in a continuous arcuate lip extending away from said flange to form with said backing plate an arcuate trough, the opposite arcuate margin of said backing plate having a plurality of spaced tabs extending axially away from said opposite arcuate margin, and a brake lining having a substantially rigid inherently arcuate shape cemented to said backing plate.

2. A demountable brake lining as set forth in claim 1, wherein: the circumferential extremities of said backing plate have tabs adapted to be folded over the ends of said brake shoe to resist circumferential displacement of said backing plate and brake lining.

[3. A demountable brake lining as set forth in claim 1, wherein: said brake shoe is provided with a series of recesses along one arcuate margin to receive said tabs, the circumferential extremities of said recesses cooperating with the circumferential edges of said tabs to resist circumferential displacement of said backing plate and brake lining.]

References Cited in the file of this patent or the original patent

UNITED STATES PATENTS

| | | |
|---|---|---|
| 1,225,555 | Achtmeyer | May 8, 1917 |
| 1,537,233 | Hartman | May 12, 1925 |
| 1,542,185 | Sweet | June 16, 1925 |
| 1,620,030 | Krieg | Mar. 8, 1927 |
| 1,772,639 | Slade | Aug. 12, 1930 |
| 1,856,812 | Jirka | May 3, 1932 |
| 1,903,723 | Palmer | Apr. 11, 1933 |
| 1,950,260 | Nelson | Mar. 6, 1934 |
| 2,027,823 | Hoffman | Jan. 14, 1936 |
| 2,153,341 | Ruffino | Apr. 4, 1939 |
| 2,326,300 | Kraft | Aug. 10, 1943 |
| 2,598,545 | House | May 27, 1952 |

FOREIGN PATENTS

| | | |
|---|---|---|
| 898,821 | France | May 8, 1945 |
| 372,169 | Italy | June 19, 1939 |